(12) United States Patent
Nathan

(10) Patent No.: US 7,863,870 B2
(45) Date of Patent: Jan. 4, 2011

(54) SELF-ADJUSTING BLEEDER FOR A FORWARD CONVERTER

(75) Inventor: Kanthimathi T. Nathan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 419 days.

(21) Appl. No.: 12/025,635

(22) Filed: Feb. 4, 2008

(65) Prior Publication Data

US 2009/0196079 A1    Aug. 6, 2009

(51) Int. Cl.
   *G05F 1/10* (2006.01)
(52) U.S. Cl. ..................................... 323/222
(58) Field of Classification Search ......... 323/222–225, 323/229–233; 307/100
   See application file for complete search history.

(56) References Cited

U.S. PATENT DOCUMENTS

| | | | |
|---|---|---|---|
| 4,253,055 A * | 2/1981 | Gatten | 323/284 |
| 4,384,214 A | 5/1983 | Crick et al. | |
| 5,479,087 A | 12/1995 | Wright | |
| 5,550,411 A * | 8/1996 | Baker | 307/100 |
| 5,991,180 A | 11/1999 | Vogel et al. | |
| 7,196,918 B2 * | 3/2007 | Steffen et al. | 363/49 |

FOREIGN PATENT DOCUMENTS

EP    1693948    8/2006

* cited by examiner

*Primary Examiner*—Matthew V Nguyen
(74) *Attorney, Agent, or Firm*—Oral Caglar, Esq.

(57) ABSTRACT

A switched mode power supply (SMPS) may be operated with uncoupled output inductors. Overvoltage produced by "low-load" conditions may be controlled through use of an adaptive regulating bleeder. The bleeder may comprise a shunt regulator and a power dissipation resistor connected in parallel with a load of the SMPS. As load on the SMPS is reduced below a predetermined level, the shunt regulator may begin to conduct. Current may pass through the power dissipation resistor. Power dissipation may occur at a rate sufficient to maintain continuous conductance through an output inductor of the SMPS. During normal load operation, the shunt regulator may not conduct and inefficient dissipation of power through the resistor may be avoided.

17 Claims, 4 Drawing Sheets

SELF-ADJUSTING BLEEDER FOR A FORWARD CONVERTER

BACKGROUND OF THE INVENTION

The present invention is in the field of electrical power supplies and, more particularly, switched-mode power supplies (SMPS's) with uncoupled output inductors.

It is well known that a multioutput SMPS with output inductors may experience an overvoltage condition at an inductor output if a load of the SMPS drops below a minimum level at that output. This loading condition may be referred to as a "low-load" condition. In contemplation of this phenomenon, many prior-art SMPS's employ coupled inductors as output inductors for multiple loads. In such an arrangement, development of a "low-load" condition in one load may be offset with a suitably high coupled load. Thus, the coupled inductors may be provided with correction by a regulation control loop when one of the loads of the SMPS reduces. This may occur even if the total load of the SMPS reduces to a state in which any one of the inductors may go into discontinuous conductance. Over-voltage conditions may be thus avoided.

In some application of an SMPS, a common converter may be used to power two or more different loads for which coupled inductors are not suitable. For example, one load may be a logic circuit and another load may be a motor load. It is desirable, in such a case, to de-couple the load effects of the motor load from the logic circuit. In this context, an SMPS may be configured so that a separate output inductor may be provided for each of the loads. In such an arrangement special provisions must be made to accommodate the possibility that one or more of the output inductors may be exposed to a "low-load" condition. A low-load condition may produce an excessive voltage or "overvoltage" at the output.

In prior-art SMPS's, this overvoltage has been prevented through use of bleeders or post voltage regulators. A typical prior-art bleeder may consist of a power dissipation resistor connected in parallel with a load of the SMPS. The power dissipation resistor will continuously conduct current and dissipate energy, even if the nominal load is maintained above a "low-load" condition. Presence of this resistive load may preclude development of excessive voltage at the output even if the nominal load decreases to a "low-load" state.

In order to be effective, a resistive bleeder must produce a current high enough to preclude overvoltage development at the output. In that regard, the resistor must continuously consume electrical power and dissipate thermal energy. Consequently, such prior-art bleeders may contribute to reduced efficiency of an SMPS. Additionally, dedicated cooling of the bleeder may be required in order to continuously dissipate thermal energy from the bleeder resistor.

In an alternate prior-art scheme of overvoltage control, a voltage regulator may be placed in series with the nominal load. The voltage regulator will drop the excessive voltage developed to ensure regulation and the right voltage at the output when the nominal load drops to a low-load condition. But, as with the bleeder described above, the voltage regulator must operate continuously even when the nominal load is present. The voltage regulator needs to drop some voltage across itself for proper functioning. This introduces unwanted power dissipation and decreases the efficiency of the SMPS.

As can be seen, there is a need to provide efficient overvoltage control during "low-load" conditions for an SMPS. In particular, there is a need to provide such overvoltage control in an SMPS without using coupled inductors or continuous operation of bleeders or post voltage regulators.

SUMMARY OF THE INVENTION

In one aspect of the present invention an apparatus for supplying electrical power to a variable load comprises an output inductor and a regulating bleeder to dissipate accumulating energy from the output inductor only when the load is reduced below a level that sustains continuous conductance through the inductor.

In another aspect of the present invention a switched mode power supply (SMPS) with an uncoupled output inductor comprises an output inductor, a regulating bleeder connected in parallel with a load of the SMPS. The regulating bleeder is operative only in response to an overvoltage condition in the SMPS.

In still another aspect of the present invention a method for controlling voltage in a switched mode power supply (SMPS) comprises the steps of activating a regulating bleeder responsively to a predetermined load decrease and dissipating accumulated energy from an output inductor through the regulating bleeder to maintain continuous conductance through the inductor.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in switched mode power supplies (SMPS). More particularly, the present invention may provide efficient protection from overvoltage due to discontinuous conductance in an uncoupled inductor in an SMPS. The present invention may be particularly useful in vehicles such as aircraft which may employ a single SMPS to supply power to motor loads and logic circuit loads. The present invention may provide overvoltage control with a self-adjusting regulating bleeder.

In contrast to prior-art power control systems, among other things, the present invention may embody a regulating bleeder that operates only when load conditions become low enough to produce potential overvoltage. The present invention, instead of employing a continuously operative resistive bleeder or series connected voltage regulators, may utilize a selectively operable regulating bleeder. The regulating bleeder of the present invention may produce power dissipation only when a nominal load of the SMPS reduces to a level that may cause overvoltage.

Figure 1:
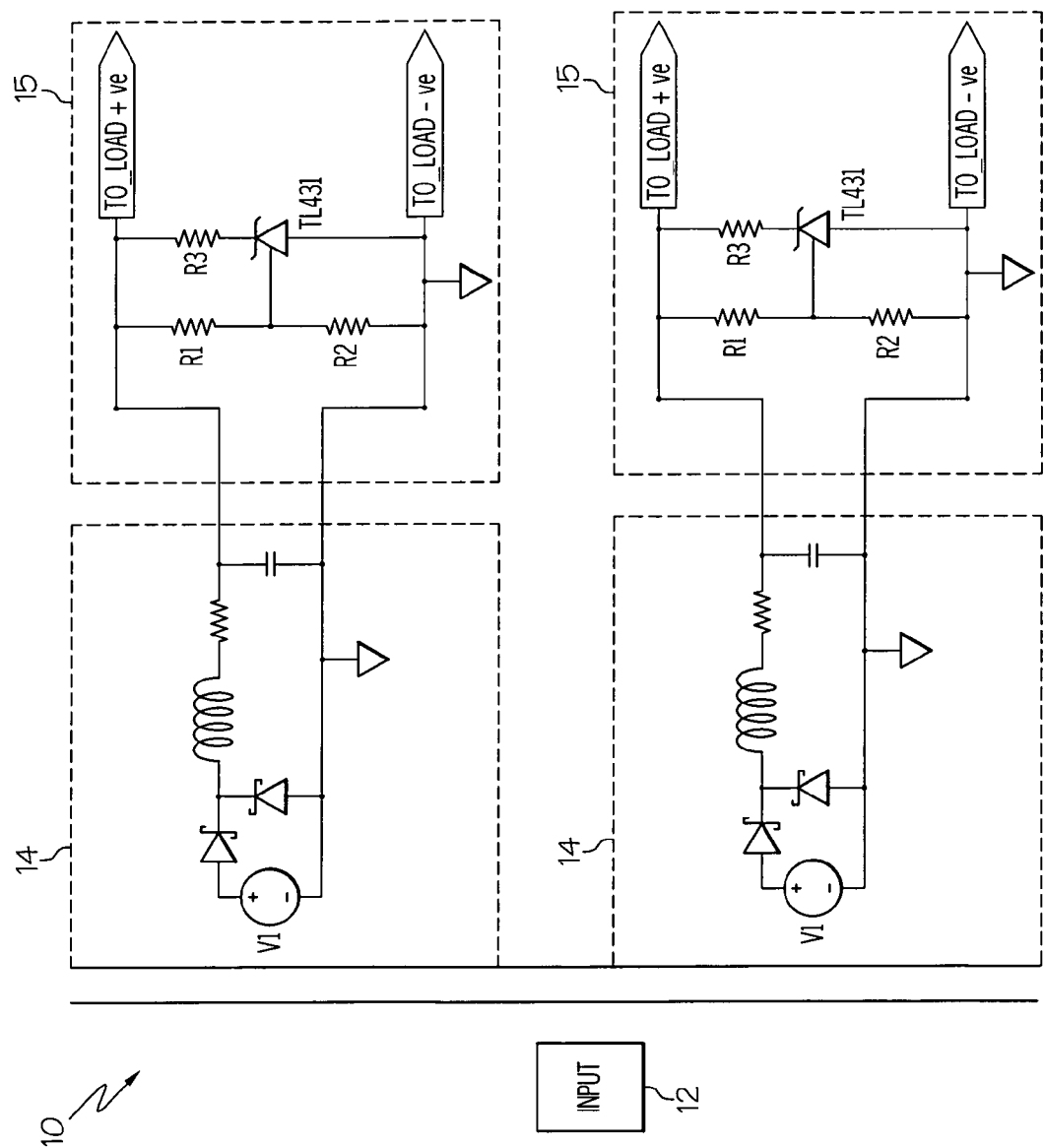
FIG. 1 is a block diagram of an embodiment of a switched mode power supply (SMPS) in accordance with the invention.

Referring now to FIG. 1, a block diagram illustrates an SMPS designated generally by the numeral 10. The SMPS 10 may comprise a conventional switching input 12 and a plurality of output sections 14 which may be comprised of various conventional rectifiers and filters. The output section 14 may be referred to as an output rectifier filter section of a forward converter. In accordance with the present invention the SMPS 10 may comprise one or more self adjusting bleeders 15. For purposes of simplicity, the illustrative SMPS 10 of FIG. 1 is shown with two of the output sections 14 and bleeders 15. It may be noted that an SMPS may be constructed in accordance with the present invention to provide power to numerous power demands. Thus the SMPS 10 may comprise any number of the output sections 14 and self adjusting bleeders 15.

Figure 2:
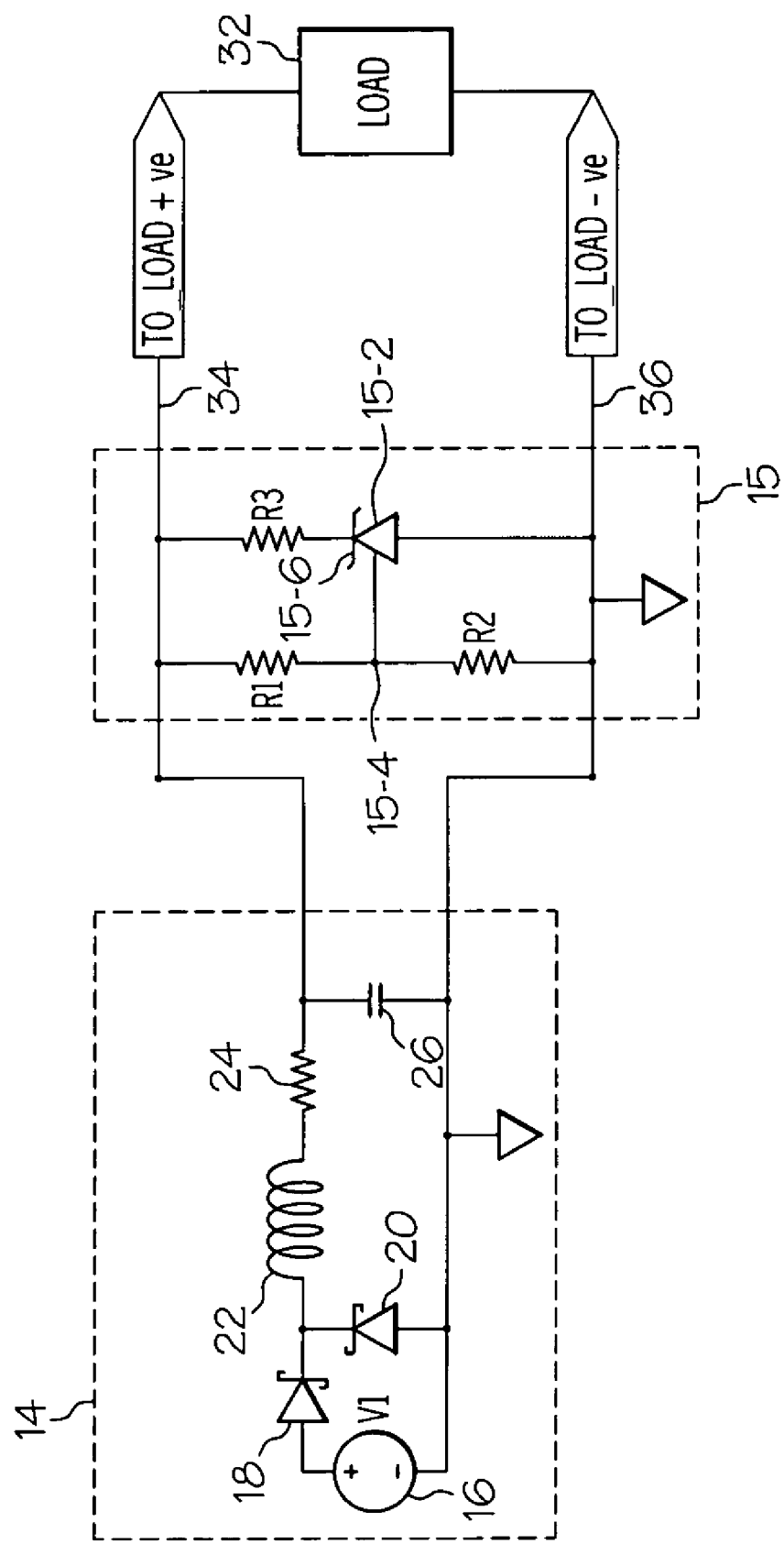
FIG. 2 is a block diagram of an embodiment of an output section of a forward converter of the SMPS of FIG. 1 in accordance with the invention.

Referring now to FIG. 2, a block diagram may illustrate inventive aspects of the invention that may be incorporated in one or more of the output sections 14 of a forward converter. The output section 14 may comprise a voltage source 16 (e.g., a winding of a transformer), diodes 18 and 20, an inductor 22, and a capacitor 26. A resistor 24 may symbolically represent a direct current (dc) resistance of the inductor 22. The self-adjusting regulating bleeder 15 may be connected in parallel with a variable load 32 between output conductors 34 and 36.

In operation, the forward converter 14 may be provided power through the voltage source 16. The voltage source 16 may comprise a conventional transformer secondary (not shown) that may be driven by a transformer primary (not shown) of the input unit 12 of FIG. 1. The inductor 22 may provide voltage regulation in a conventional manner when the load 32 is at or above a minimum level. The minimum load condition (Imin) may be determined in accordance with the expression:

$$Imin = Vo * Toff\_max/(2*L) \qquad \text{equation 1 where:}$$

Vo=output voltage;
Toff_max=maximum time that the input unit 12 is off during a switching period; and
L=inductance of the inductor 22.

If the load 32 is greater than the value determined by equation 1, stored energy in the inductor 22 needs to be discharged through the load 32. But if the load 32 is less than the equation 1 value, a condition may develop in which energy accumulates in the inductor 22. If such a reduction in the load 32 occurs, the inductor 22 may have stored energy (E) that is determined by the expression:

$$E = (\tfrac{1}{2})*L*I^2 \qquad \text{equation 2}$$

where:
L=inductance of inductor 22; and
I=the current at the end of an on period. (i.e., a portion of a switching period that the input unit is on).

Accumulation of energy within the inductor 22 may produce an undesirable voltage rise or overvoltage condition. In order to preclude such overvoltage, the accumulating energy may be dissipated by the regulating bleeder 15. The regulating bleeder 15 may dissipate power at a rate to compensate for the minimum load current Imin determined in equation 1. This power dissipation (P) may be determined in accordance with the expression:

$$P = (\tfrac{1}{2})*Vo^2*Toff\_max^2*f/L \qquad \text{equation 3}$$

where:
Vo=output voltage;
Toff_max=time that the input unit 12 is off during a switching period;
L=inductance of the inductor 22; and
f=operating frequency of the SMPS 10.

The regulating bleeder 15 may be considered to be an adaptive regulating bleeder which dissipates power only if the load 32 is less than the Imin expressed in equation 1 above. Unlike a prior-art bleeder or voltage regulator, the regulating bleeder 15 is not required to continuously dissipate any power during all of the time that the SMPS 10 may be operating above low-load conditions.

The regulating bleeder may comprise a shunt regulator 15-2, voltage setting bias resistors R1, R2 and a power dissipation resistor R3. The shunt regulator 15-2 may comprise a conventional regulating device such as, for example, a TL431 regulator. The resistors R1 and R2 may be selected so that current passing through the resistors R1 and R2 is very low. For example, for an SMPS 10 that powers a nominal 1 ampere (A) load, the resistors R1 and R2 may be selected to allow passage of only about 40 microamps (µA), an amount that may be a negligible part (i.e., about 40 parts per million {ppm}) of the nominal load. This may be compared to a prior-art bleeder which may be required to continuously allow passage of about 20% of a nominal load (i.e., about 0.2 A in the present example).

A centre point 15-4 between the resistors R1 and R2 may be connected to a reference pin 15-6 of the shunt regulator 15-2. The shunt regulator 15-2 may begin conducting only when output voltage reaches a minimum level (Vz) which may be determined in accordance with the expression:

$$Vz = 2.5*(R1+R2)/R2 \qquad \text{equation 4}$$

where:
Vz=reference pin voltage of shunt regulator 15-2
R1=resistance of R1; and
R2=resistance of R2.

It may be seen that as the load 32 decreases, Vz may rise and conversely increasing load may produce a reduction in Vz. Thus, whenever the load 32 is equal to or greater than Imin of equation 1, the regulating bleeder 15 may conduct only a small current (i.e., about 40 µA in a power supply that drives a nominal load of about 1 A). However, as the load 32 decreases below a level of Imin, the output voltage may rise and exceed the level Vz of equation 4. In that case, the shunt regulator 15-2 may begin conducting current which may pass through the power dissipation resistor R3. R3 may have a resistance low enough to allow passage of a substantial fraction of the nominal load (e.g., about 20%) of the SMPS 10. Overvoltage may thus be precluded.

After the shunt regulator 15-2 begins conducting, it may continue to conduct at a current level (Ir) that may be determined in accordance with the expression:

$$Ir + Iload = (Vin - Vo)*Ton/2L \qquad \text{equation 5}$$

where:
Vin=voltage produced by the voltage source 16 during the on period;
Vo=output voltage;
Ton=a portion of a switching period when the input unit is on;
L=inductance of inductor 22; and
Iload=Load current.

Values of R1 and R2 may be determined in accordance with the following expression:

$$R1+R2 = Vo(\text{maximum})/\text{Bias\_current} \qquad \text{equation 5}$$

where:

Bias_current is chosen such that it is about 10 times the input bias current for the regulator 15-2. (e.g., a TL431 has a maximum input bias current spec of 4 uA, Hence 40 uA of bias current may be chosen).

In an illustrative one of the SMPS's 10, Vo (maximum) may be about 10 volts (V). Maximum tolerable bias current through the resistors R1 and R2 may be about 40 μA. In that case R1+R2=250 K ohms. For a shunt regulator 15-2 such as a TL41, a reference pin voltage may be about 2.5 V. In this example, a relationship of R1 and R2 may be expressed as:

$$R2*10/(R1+R2)=2.5 \qquad \text{equation 6}$$

Values of R1 and R2 may be determined by solving equation 5 and 6.

Figure 3:
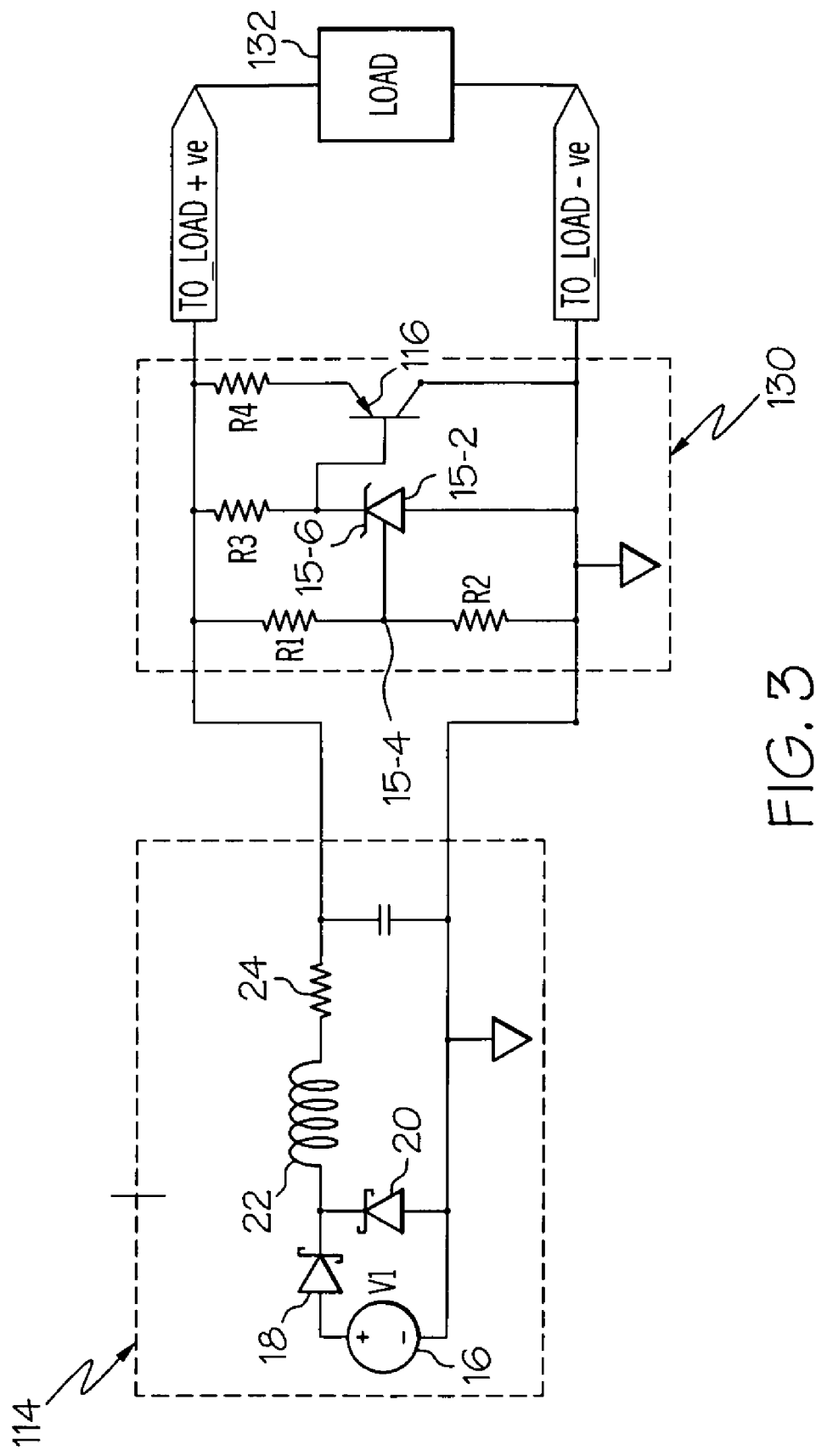
FIG. 3 is a block of another embodiment of an output section of a forward converter of the SMPS of FIG. 1 in accordance with the present invention.

Referring now to FIG. 3, an alternate embodiment of the present invention is illustrated. In FIG. 3 a forward converter 114 of the SMPS 10 may be configured to provide power to a load 132 greater than the load 32 of FIG. 2. For example the nominal value of the load 132 may as large as 5 amps. Imin in this case may be as high as 1 A. The shunt regulator 15-2 may not be capable of conducting current at this level.

In the forward converter 114, a shunt power transistor 116 may be connected to provide a conduction path 118 in parallel with a conduction path 120 through the shunt regulator 15-2. When the shunt regulator 15-2 begins to conduct a drive current may be applied to the transistor 116. The transistor 116 may then begin conducting. A power dissipation resistor R4 may be placed in series with the transistor 116. The resistor R4 may have a resistance lower than that of a resistor R3 which may be in series with the shunt regulator 15-2. For example R3 may have a resistance of 4 K ohms and R4 may have a resistance of only 6.8 ohm. This relationship between the resistors R3 and R4 may result in most of the power dissipation occurring in R4 and transistor 116 instead of in R4 and regulator 15-2. One of the regulators 15-2 such as a TL431 is capable of handling only 770 milliwatts (mW), One of the transistors 116 transistors may be chosen with much higher power capacity (e.g., in the range of 10-40 Watts). Consequently, the shunt regulator 15-2 may be employed as a control element without risk of damage from excessive power dissipation and current through the shunt regulator 15-2.

Figure 4:
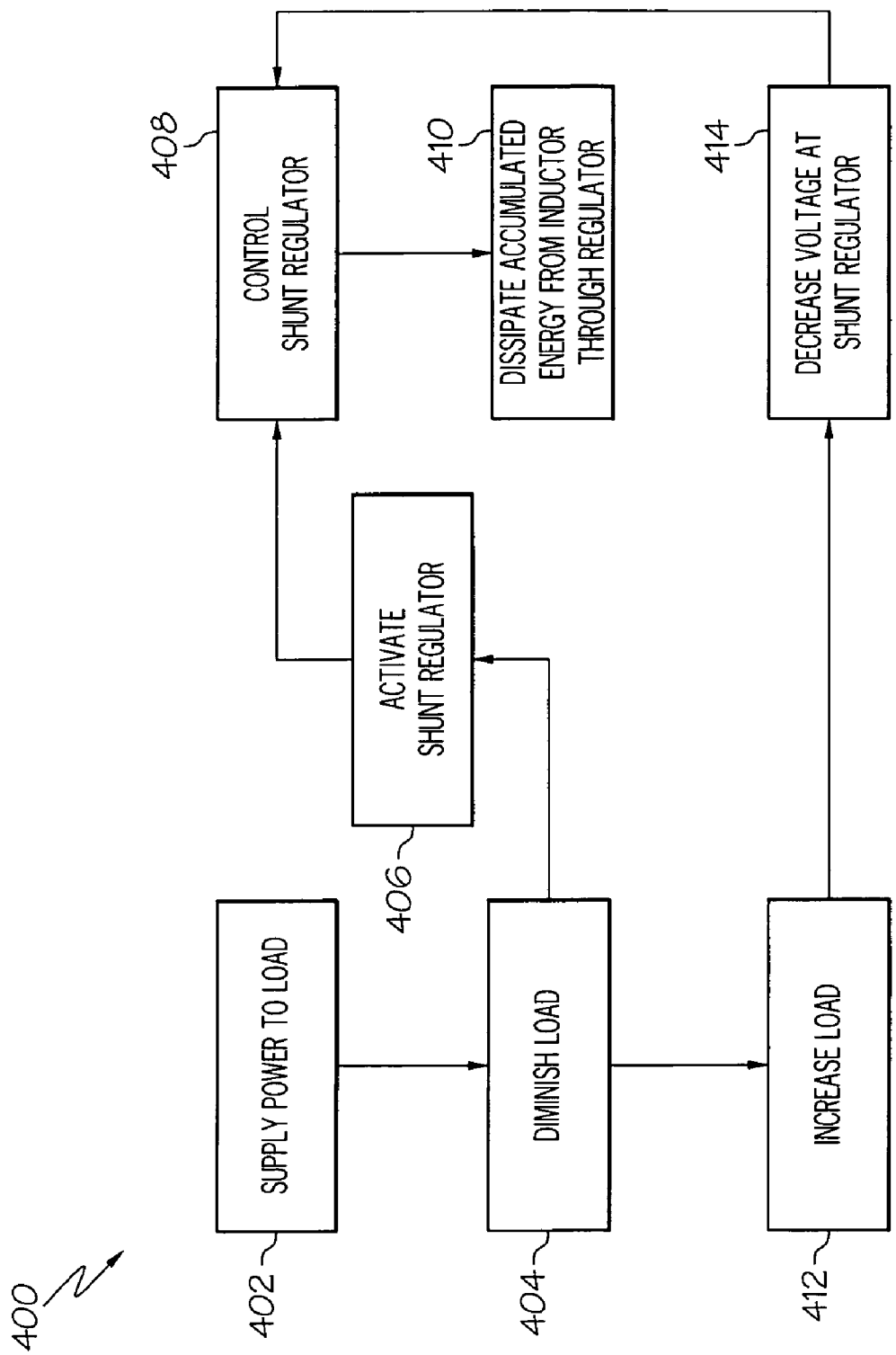
FIG. 4 is a flow chart of a method for controlling a power supply in accordance with the present invention.

In one embodiment of the present invention, a method is provided for regulating an SMPS. In that regard the method may be understood by referring to FIG. 4. In FIG. 4, a flow chart portrays various aspects of an inventive method 400.

In a step 402, power may be supplied to a load (e.g., an input unit 12 of an SMPS 10 may provide power to a forward converter 14 of the SMPS 10 for a load 32). In a step 404, the load may be diminished (e.g., the load 32 may be reduced below the level that provides continuous conductance through an inductor 22). In a step 406, a shunt regulator may be activated to maintain continuous conductance (e.g., the shunt regulator 15-2 may be activated in response to development of a voltage Vz which may arise from accumulation of energy in the inductor 22).

In a step 408, the shunt regulator may be controlled (e.g., the shunt regulator 15-2 may continue conducting unless and until an output voltage declines to a level just equal to Vz). In a step 410, accumulated energy from the inductor may be dissipated (e.g., current through the shunt regulator 15-2 and the resistor R3 may dissipate energy).

In a step 412, the load may be increased (e.g., the load 32 may be increased up to or above a level that provides continuous conductance through the inductor 22). In a step 414, voltage applied to the shunt regulator may be decreased (e.g., continuous conductance through the inductor 22 may diminish inductor output voltage below Vz). In the step 408, the shunt regulator may be controlled to cease conduction.

It should be understood, of course, that the foregoing relates to exemplary embodiments of the invention and that modifications may be made without departing from the spirit and scope of the invention as set forth in the following claims.

I claim:

1. An apparatus for supplying electrical power to a variable load comprising:
    a forward converter comprising an output inductor that sustains continuous conductance only when a load condition exceeds a minimum load condition (Imin) given by the expression:

$$Imin=Vo*Toff\_max/(2*L) \text{ where:}$$

Vo=output voltage of the forward converter;
   Toff_max=maximum time that an input unit is off during a switching period; and
   L=inductance of the output inductor;
    a regulating bleeder to redirect current from a high resistance path to a low resistance path to dissipate accumulating energy from the output inductor of the forward converter only when current through the output inductor is reduced below Imin.

2. The apparatus of claim 1 wherein the regulating bleeder further comprises:
    a first power dissipating resistor;
    the first resistor being connected in series with the shunt regulator; and
    the resistor/shunt regulator combination being connected in parallel with the load.

3. The apparatus of claim 1 wherein the regulating bleeder further comprises:
    a transistor responsive to presence of current through the shunt regulator;
    the transistor being connected in parallel with the load; and
    the transistor being connected in series with a second power dissipating resistor.

4. The apparatus of claim 3 wherein:
    the first and the second power dissipating resistors are connected in parallel with each other;
    the first power dissipating resistor has a first resistance; and
    the second power dissipating resistor has a second resistance less than the first resistance.

5. The apparatus of claim 4 wherein the first resistance is large enough to allow passage only a negligible portion of a nominal load current therethrough.

6. A switched mode power supply (SMPS) with an uncoupled output inductor comprising:
    a regulating bleeder connected in parallel with a load of the SMPS; and
    the regulating bleeder being operative only in response to an overvoltage condition in the SMPS;
    wherein the regulating bleeder comprises:
        at least two voltage setting bias resistors;
        at least two voltage setting bias resistors being connected in series with each other;
        series connected voltage setting bias resistors being connected in parallel with the load;
        a voltage reference point between the at least two voltage setting bias resistors; and
        a reference pin of the shunt regulator being connected to the voltage reference point.

7. The SMPS of claim 6 wherein the regulating bleeder comprises:
   a shunt regulator; and
   at least one power dissipation resistor connected in series with the shunt regulator.

8. The SMPS of claim 7 wherein the regulating bleeder further comprises:
   a second power dissipation resistor connected in parallel with the load;
   a transistor connected in series with the second power dissipation resistor; and
   the transistor being operable responsively to activation of the shunt regulator.

9. The SMPS of claim 8 wherein a second power dissipation resistor is used whose value is much less than the resistance of the first power dissipation resistor.

10. The SMPS of claim 6 wherein current through the series connected voltage setting bias resistors is no greater than 0.1% of a nominal load of the SMPS.

11. A method for controlling voltage in a switched mode power supply (SMPS) comprising the steps of:
    activating a regulating bleeder responsively to a predetermined increase in output voltage due to a load decrease; and
    dissipating accumulated energy from an output inductor through the regulating bleeder to maintain continuous conductance through the inductor;
    wherein the step of activating the regulating bleeder is performed to increase output current when the load is less than the Imin determined in accordance with the expression:

$$Imin = Vo * Toff\_max / (2*L)$$

where:
Vo=output voltage of the SMPS;
Toff_max=maximum time that the SMPS is off during a switching period; and
L=inductance of an output inductor of the SMPS.

12. The method of claim 11 further comprising the step of:
    de-activating the regulating bleeder when the load equals or exceeds one half of Imin.

13. The method of claim 11 wherein the step of dissipating accumulated energy comprises passing current from the inductor through a power dissipating resistor connected in parallel with the load.

14. The method of claim 13 wherein the current (Ir) passing through the power dissipating resistor is determined in accordance with the expression:

$$Ir + Iload = (Vin - Vo) * Ton / 2L$$

where:
Vin=voltage at an input side of the inductor;
Vo=voltage at an output side of the inductor
Ton=a portion of a switching period that SMPS is on; and
L=inductance of inductor
Iload=Load current.

15. The method of claim 11 wherein the step of activating the regulating bleeder comprises:
    passing current through at least two voltage setting bias resistors;
    at least two voltage setting bias resistors being connected in parallel with the load and in series with each other; and
    applying a voltage that develops between the two voltage setting bias resistors to a reference pin of a shunt regulator whereby the shunt regulator begins conducting current when said voltage reaches a predetermined level.

16. The method of claim 15 further comprising the steps of:
    activating a transistor responsively to current conduction through the shunt regulator; and
    passing current through the transistor and through a power dissipation resistor the series combination of which is connected in parallel with the load.

17. The method of claim 16 further comprising the step of de-activating the transistor when the load is great enough to produce continuous conductance through the inductor.

* * * * *